(12) United States Patent
Zokaei et al.

(10) Patent No.: US 11,624,450 B2
(45) Date of Patent: Apr. 11, 2023

(54) FLUID DELIVERY MOUNTING PANEL AND SYSTEM

(71) Applicant: Applied Materials, Inc., Santa Clara, CA (US)

(72) Inventors: Sohrab Zokaei, Los Altos, CA (US); Kiran Garikipati, Santa Clara, CA (US); Shawn Thanhsan Le, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 17/244,557

(22) Filed: Apr. 29, 2021

(65) Prior Publication Data
US 2022/0349489 A1 Nov. 3, 2022

(51) Int. Cl.
*F16K 27/00* (2006.01)
*F16K 37/00* (2006.01)
*F15B 13/08* (2006.01)

(52) U.S. Cl.
CPC .......... *F16K 27/003* (2013.01); *F16K 37/005* (2013.01); *F15B 13/0814* (2013.01); *Y10T 137/87885* (2015.04)

(58) Field of Classification Search
CPC ............. F15B 13/0803; F15B 13/0839; Y10T 137/87885
See application file for complete search history.

(56) References Cited

U.S. PATENT DOCUMENTS

| | | | |
|---|---|---|---|
| 3,680,576 A * | 8/1972 | Kiwak | F15C 5/00 137/833 |
| 3,823,457 A * | 7/1974 | Staas | F25J 5/002 29/890.039 |
| 3,957,079 A | 5/1976 | Whiteman | |
| 4,951,709 A | 8/1990 | Kirkham | |
| 6,125,887 A | 10/2000 | Pinto | |
| 6,186,177 B1 | 2/2001 | Maher | |
| 6,234,191 B1 * | 5/2001 | Clarke | B60T 17/04 137/561 A |

(Continued)

FOREIGN PATENT DOCUMENTS

WO 02068127 A2 9/2002

OTHER PUBLICATIONS

International Search Report and Written Opinion for International application No. PCT/US2022/026825, 11 pages, dated Aug. 8, 2022.

*Primary Examiner* — Robert K Arundale
(74) *Attorney, Agent, or Firm* — Lowenstein Sandler LLP

(57) ABSTRACT

An apparatus comprises a mounting panel including a top plate having multiple vias and multiple orifices. An internal face of the top plate includes a first cut-out region and channels through which to flow a process fluid. The first cut-out region can be a reservoir in which to contain the process fluid. The multiple vias are adapted for passing the process fluid through the top plate. The multiple orifices are adapted for attaching a plurality of process fluid control components to the mounting panel. An inner plate also has multiple additional vias. The apparatus includes a bottom plate, where the inner plate is compacted between the top plate and the bottom plate to form an integral metallic body in which to contain and flow the process fluid.

8 Claims, 11 Drawing Sheets

(56) References Cited

U.S. PATENT DOCUMENTS

| | | | |
|---|---|---|---|
| 6,880,745 B2* | 4/2005 | Stueber | B23K 20/002 |
| | | | 228/205 |
| 7,798,388 B2 | 9/2010 | Crockett et al. | |
| 2002/0072164 A1* | 6/2002 | Umotoy | H01L 21/67017 |
| | | | 438/200 |
| 2004/0045614 A1* | 3/2004 | Subramanian | F15B 13/0871 |
| | | | 137/884 |
| 2004/0173270 A1* | 9/2004 | Harris | F16K 27/003 |
| | | | 137/884 |
| 2005/0241707 A1 | 11/2005 | Harris et al. | |
| 2008/0202614 A1* | 8/2008 | Mamyo | F15B 13/0871 |
| | | | 137/884 |
| 2009/0098407 A1* | 4/2009 | Minegishi | F15B 13/0839 |
| | | | 428/641 |
| 2010/0282347 A1* | 11/2010 | Iijima | A01G 25/16 |
| | | | 137/625 |
| 2016/0108523 A1 | 4/2016 | Lee et al. | |
| 2016/0111257 A1 | 4/2016 | Kellogg et al. | |
| 2018/0082870 A1 | 3/2018 | Wolgast | |

* cited by examiner

FLUID DELIVERY MOUNTING PANEL AND SYSTEM

TECHNICAL FIELD

Embodiments of the present disclosure relate to a fluid delivery mounting panel and to a corresponding system.

BACKGROUND

Current process fluid panel, such as gas panels, are designed and built using discrete lines, fluid control components, and monitoring sensors. These designs end up being very complicated, taking up significant space, and costly to implement. The different controlled paths through such panels can be difficult to troubleshoot with so many different lines and components being routed in all different directions from process fluid sources and to processing destinations, such as processing chambers. The risk of leaks also increases the more couplers, brackets, elbows, and the like that are used in routing the fluid lines. Further, getting such fluid lines to a certain temperature and/or pressure and maintaining that temperature and/or pressure, such as to prevent condensation and particle build up in the fluid lines, can be challenging and costly, e.g., often involves temperature control units that take up further space and cost.

SUMMARY

Some of the embodiments described herein cover an apparatus that includes a mounting panel including a top plate having multiple vias and multiple orifices that are sized differently than the multiple vias. An internal face of the top plate includes a first cut-out region and a plurality of channels through which to flow a process fluid. The first cut-out region can be a reservoir in which to contain the process fluid. The multiple vias are adapted for passing the process fluid through the top plate and the multiple orifices are adapted for attaching a plurality of process fluid control components to the mounting panel. The apparatus further includes an inner plate having multiple additional vias. The apparatus further includes a bottom plate, where the inner plate is compacted between the top plate and the bottom plate to form an integral metallic body in which to contain and flow the process fluid.

In some embodiments, a system includes a mounting panel including a plurality of diffusion-bonded metal plates that form: a reservoir to contain a process fluid; multiple channels through which to flow the process fluid, wherein at least a pair of the multiple channels are connected with the reservoir; and a plurality of vias through which to flow the process fluid to and from process fluid control components attached to the mounting panel. The system further includes a temperature sensor attached to a top of the mounting panel, the temperature sensor in fluid communication with the reservoir through one of the plurality of vias. The system further includes a set of inlet ports attached to the mounting panel, the set of inlet ports to receive the process fluid. The system further includes at least one outlet port attached to the mounting panel, the at least one outlet port to output the process fluid from the mounting panel.

In additional or related embodiments, a method of operating a process fluid delivery system is provided where the system includes a mounting panel that forms a reservoir to contain a process fluid, multiple channels through which to flow the process fluid, a plurality of vias between a top of the mounting panel and the reservoir and between the top of the mounting panel and the multiple channels. The system further includes a pressure sensor attached to a top of the mounting panel and that is in fluid communication with the reservoir. The method of operating this system includes causing the process fluid to flow from an inlet port through a first channel of the multiple channels. The method further includes causing the process fluid to flow from the first channel through a first valve into a second channel of the multiple channels, the second channel in fluid communication with the reservoir. The method further includes determining, using the pressure sensor, a pressure of the process fluid within the reservoir. The method further includes causing the process fluid to flow from the reservoir into a third channel of the multiple channels.

Numerous other features are provided in accordance with these and other embodiments of the disclosure. Other features and embodiments of the present disclosure will become more fully apparent from the following detailed description, the claims, and the accompanying drawings.

BRIEF DESCRIPTION OF THE DRAWINGS

The present disclosure is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION OF EMBODIMENTS

Embodiments described herein are related to apparatuses, systems, and methods for causing process fluid to flow through a diffusion-bonded mounting panel and corresponding process fluid delivery system. In addition to the above deficiencies in the current state of the art, many fluid panels require an external reservoir to retain liquid or gas that then supplies the fluid panel with process fluid such as gas on an as-needed basis, for re-directing to a proper processing chamber. The addition of the external reservoir also adds complexity and takes up additional space in a processing fab, which space is in more demand and becoming more expensive over time.

Aspects of the present disclosure address the above and other deficiencies by providing a mounting panel that is designed and manufactured from multiple metallic plates, and in which is integrated multiple control flow paths. More specifically, each metallic plate can be molded, cast, forged, machined, or carved to define different cut-outs, vias, and orifices that, when combined with the other metal plates, form at least one reservoir along with multiple channels. The multiple channels can be formed between the vias in a way that the process fluid flows through the vias, between the mounting panel and different process fluid control components such as inlet ports, output ports, valves, filters, regulators, mass flow controllers, and the like. At least a pair of the multiple channels can be formed on different sides of the reservoir in order to flow process fluid into and out of the reservoir.

In some embodiments, use of the reservoir and precision-formed vias and/or a dosing valve at an exit of the reservoir can replace a mass flow controller. Because mass flow controllers are much larger, require electronics and electrical control, and are more expensive, employing the disclosed integrated features to form at least one reservoir within the mounting panel can save on this expense and space. Further, by mounting a temperature control plate (such as a heating plate or a cooling plate) on the bottom of the mounting panel, the process fluid within the reservoir, in the multiple channels, and throughout the attached process fluid control components can be maintained at a constant temperature without the expense and space of a separate external heater or cooler. Other advantages will be apparent to those skilled in the art of process fluid panels and associated process fluid delivery systems discussed hereinafter.

Figure 1A:
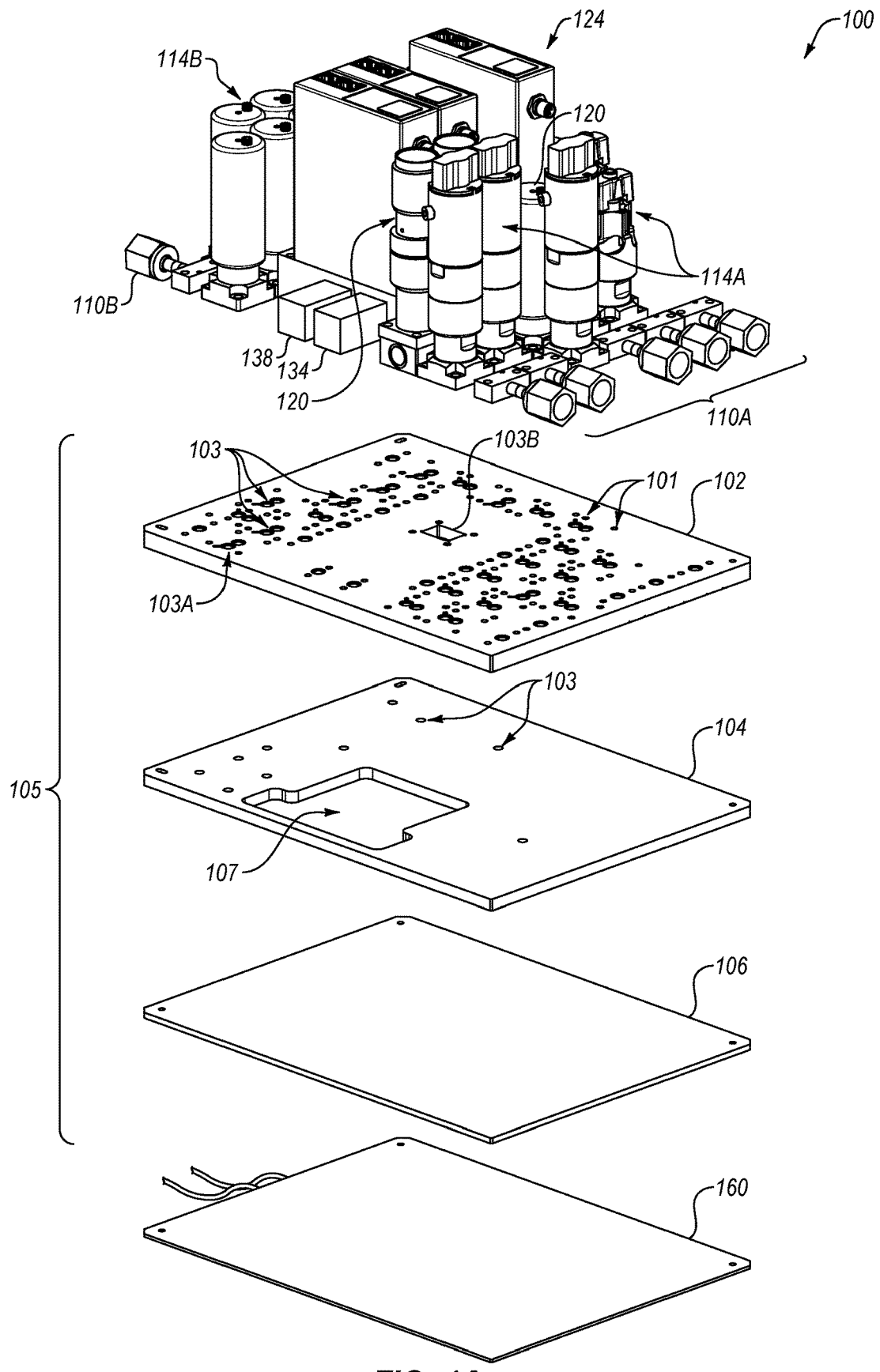
FIG. 1A is an exploded perspective view of a diffusion-bonded mounting panel and corresponding process fluid delivery system, according to an embodiment of the disclosure.
Figure 1B:
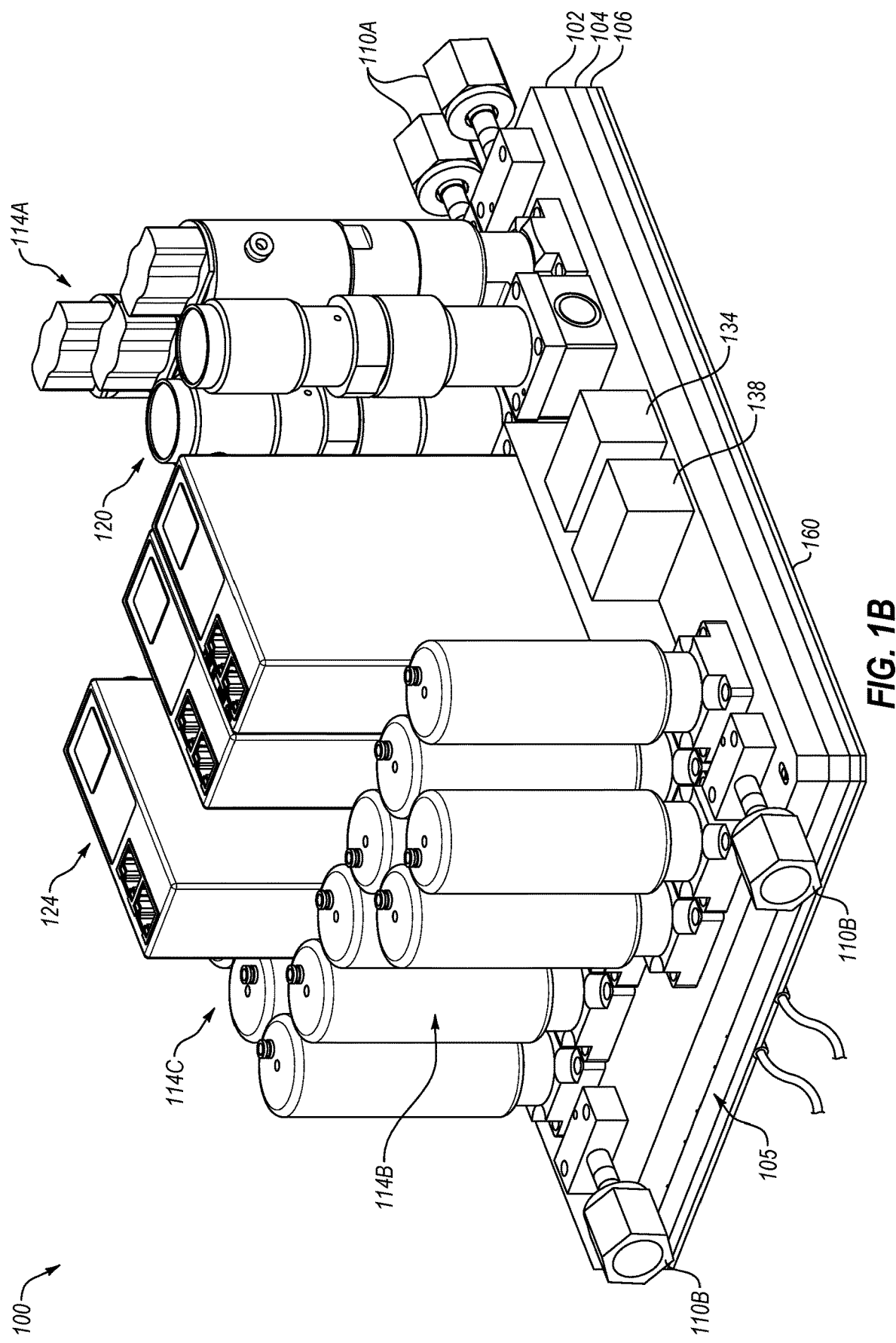
FIG. 1B is a perspective view of the assembled diffusion-bonded mounting panel and corresponding process fluid delivery system of FIG. 1A according to an embodiment of the disclosure.
Figure 1C:
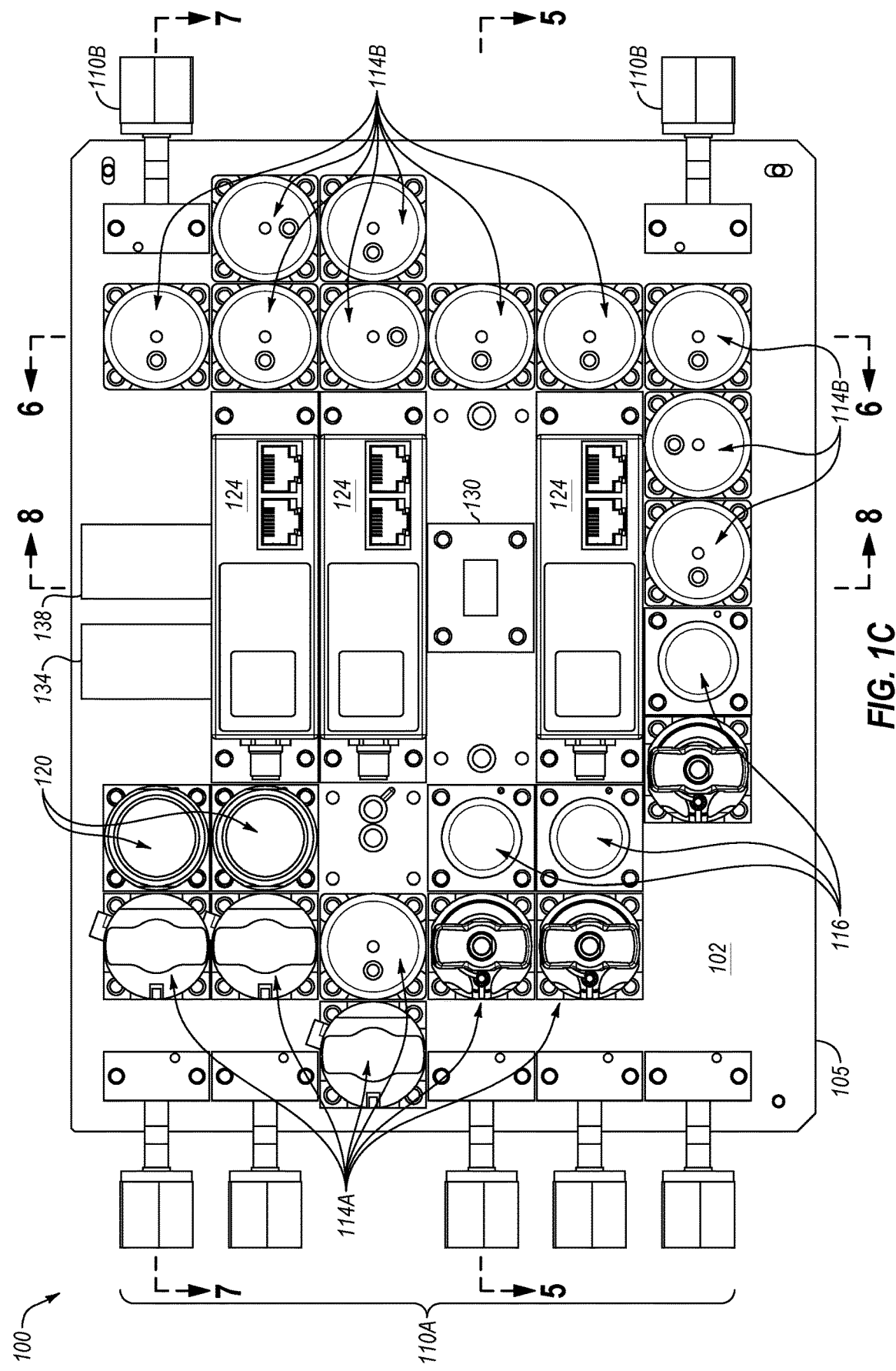
FIG. 1C is a top, plan view of the assembled diffusion-bonded mounting panel and corresponding process fluid delivery system of FIG. 1A according to an embodiment of the disclosure.

FIG. 1A is an exploded perspective view of a diffusion-bonded mounting panel 105 and corresponding process fluid delivery system 100, according to an embodiment of the disclosure. FIG. 1B is a perspective view of the assembled diffusion-bonded mounting panel 105 and corresponding process fluid delivery system 100 of FIG. 1A according to an embodiment of the disclosure. FIG. 1C is a top, plan view of the assembled diffusion-bonded mounting panel 105 and corresponding process fluid delivery system 100 of FIG. 1A according to an embodiment of the disclosure.

The mounting panel 105 can include a top plate 102, a bottom plate 106, and one or more intermediate plates such as an inner plate 104. Thus, the mounting panel, although not illustrated, can include multiple inner plates 104. Also reference to "top" and "bottom" are for ease of explanation, but can be switched or understood to be generally a first external plate and a second external plate of the mounting panel 105, respectively. The top plate 102, the bottom plate 106, and the one or more intermediate plates can be made of metal. For example, the inner plate 104 can be compacted between the top plate 102 and the bottom plate 106 to form an integral metallic body in which to contain and flow the process fluid, e.g., effectively replacing existing process fluid panels such as gas panels. In one embodiment, the top plate 102, the bottom plate 106, and the one or more intermediate plates are diffusion bonded, e.g., via a method of diffusion bonding of steel and steel alloys under high temperature and high vacuum pressure. One example of diffusion bonding that can be used is disclosed with reference to U.S. Pat. No. 7,798,388, issued Sep. 21, 2010, which is herein incorporated by this reference in its entirety.

In some embodiments, the mounting panel 105 further includes a temperature-controlled plate 160 attached to a bottom of the mounting panel 105, e.g., to an external face of the bottom plate 106. This temperature-controlled plate 160 can have a very low profile and thus not take up much space. The temperature-controlled plate 160, which will be discussed in more detail, can be a heating plate, a cooling plate, or a combination thereof, designed to impart one of heat or cooling to the mounting panel 105. In some embodiments, the temperature-controlled plate 160 is also diffusion bonded to the external face of the bottom plate 106.

Figure 2:
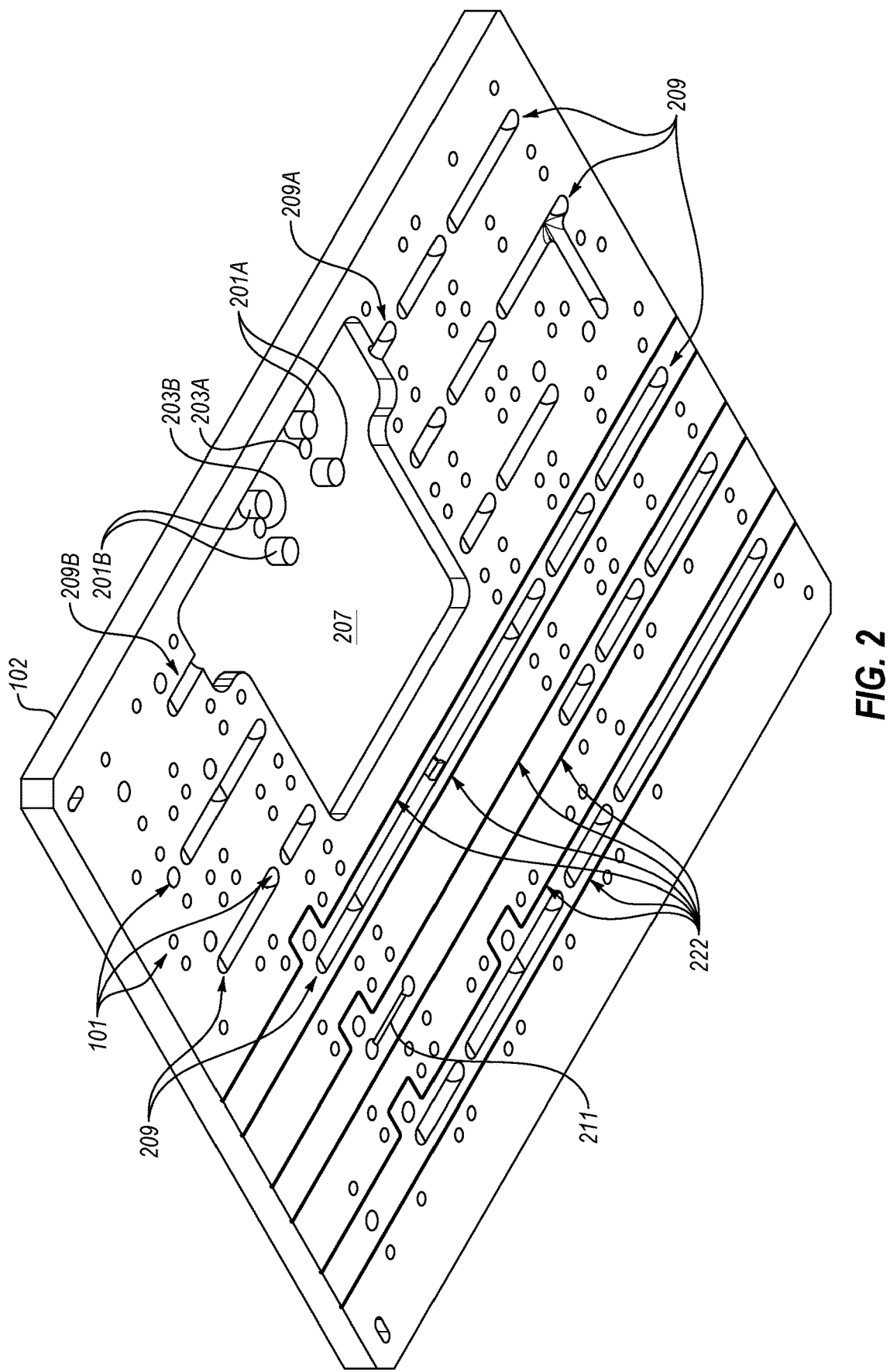
FIG. 2 is a bottom perspective view of a top plate of the mounting panel according to an embodiment of the disclosure.
Figure 3:
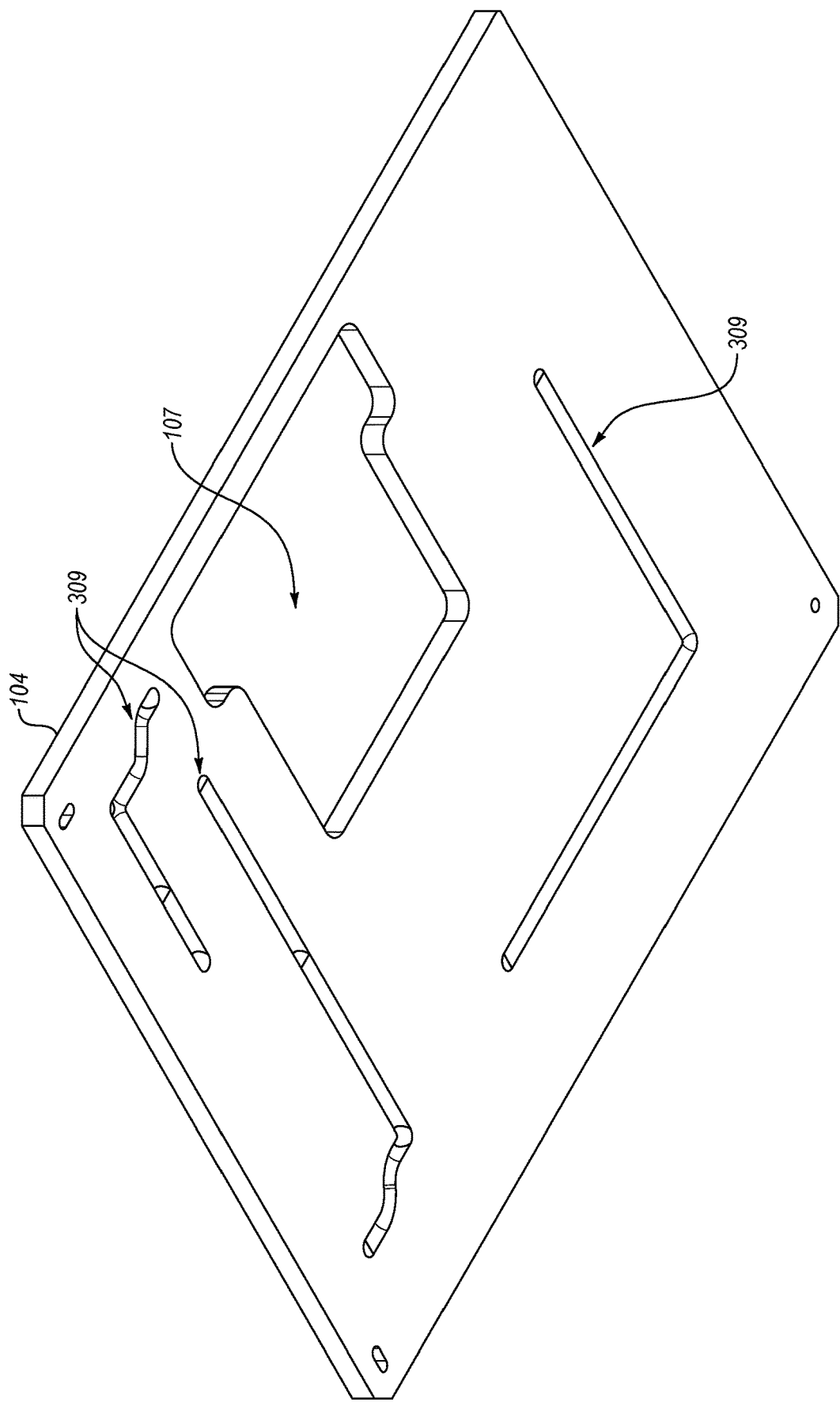
FIG. 3 is a bottom perspective view of an inner plate of the mounting panel according to an embodiment of the disclosure.

With additional reference to FIGS. 2-3, FIG. 2 is a bottom perspective view of the top plate 102 of the mounting panel 105 according to an embodiment. FIG. 3 is a bottom perspective view of the inner plate 104 of the mounting panel 105 according to an embodiment. In some embodiments, the top plate 102 includes multiple vias 103 and multiple orifices 101. The multiple vias 103 can be adapted for passing the process fluid through the top plate 102 and, in some embodiments, at least some of the multiple vias 103 vary in size to cause different rates of flow of the process fluid through different fluid control paths of the mounting panel 105. The multiple orifices 101 can be adapted for attaching a number of process fluid control components to the mounting panel 105. In some embodiments, the orifices 101 are internal to the multiple vias 103 or any of multiple channels 209. In various embodiments, each of the multiple vias 103 can generally be larger in diameter than each of the multiple orifices 101, as the vias 103 are designed (e.g., sized) to flow process fluid into and out of the mounting panel 105, as will be described. In contrast, the multiple orifices 101 can be designed (e.g., sized) to receive attachment mechanisms such as machine screws or bolts to attachment the process fluid control components to the top plate 102.

In disclosed embodiments, the top plate 102 also includes a first cut-out region 207 (FIG. 2) and multiple channels 209 through which to flow the process fluid within the mounting panel 105. In one embodiment, the first cut-out region 207 is a reservoir. The channels of the multiple channels 209 can be formed of different shapes, including circular, semi-circulator, V-shaped, and the like. The inner plate 104 also includes some of the multiple vias 103 and can optionally include a second cut-out region 107. In some embodiments, the first cut-out region 207 and the second cut-out region 107 correspond (after diffusion bonding) to form a reservoir (best seen in FIGS. 7-8).

In various embodiments, the reservoir (whether formed within only one plate or multiple plates) is used to store a process fluid, such as gas, or can be used to store a liquid that is then converted to a gas before flowing the gas elsewhere within the process fluid delivery system 100. The conversion can be facilitated via heating the mounting panel as will be discussed in more detail. The reservoir can also be used as a reference volume to calibrate flow parameters and to troubleshoot and tune process recipes. Additionally, the inner plate 104 can also include multiple channels 309 formed on an internal face of the inner plate 104, as illustrated in FIG. 3. These channels 309 can communicate through the vias 103 in the top plate 102 and the inner plate 104. In some embodiments, the multiple channels 309 are omitted and thus are optional. In other embodiments, additional ones of multiple inner plates also include channels.

With additional reference to FIG. 2, the internal face of the top plate 102 can include a number of grooves 222 that define separations between channels and process fluid paths, for example. The grooves 222 can be used as a leak check to determine leak integrity of the diffusion bond and prevent cross-talk between adjacent ones of the multiple channels 209.

In some embodiments, the multiple channels 209 includes a first channel 209A that leads into the reservoir from a first side of the reservoir and a second channel 209B that exits from a second side of the reservoir. Further, the multiple vias 103 can include at least one precision-sized via 103A positioned at an exit of the second channel 209B and designed to control a flow rate of the process fluid that exits the reservoir. Additionally, the multiple vias 103 can include a larger or rectangular via 103B through which to insert a flow sensor 130. In some embodiments, the multiple channels 109 also includes at least one reduce-sized channel 211. Other sizes are envisioned. In this way, varying sizes of the multiple channels 109 enables various flow rates that might be required by different processes, and can be achieved via configuring a process fluid flow path that includes a mixture of various channel sizes.

In various embodiments, the process fluid delivery system 100 includes a number of process fluid control components attached to the mounting panel 105, e.g., attached to the top of the top plate 102 using the multiple orifices 101. These process fluid control components can include, but not be limited to, inlet ports 110A, valves 114A coupled with the inlet ports 110A, outlet ports 110B, valves 114B coupled with the outlet ports 110B, filter 116, pressure regulators 120, mass flow controllers 124, at least one flow sensor 130, at least one temperature sensor 134, and at least one pressure sensor 136. Although not illustrated, the process fluid control components can also include sampling ports and other measurements sensors, e.g., an infrared sensor to detect composition of the process fluid.

In some embodiments, a set of the inlet ports 110A can be attached to a top of the mounting panel 105 while a set of the outlet ports 110B can also be attached to the top of the mounting panel. The set of inlet ports 110A and the set of outlet ports 110B can be attached such that connectors of the ports extend beyond the mounting panel 105 for easy access. The set of inlet ports can receive the process fluid while the set of outlet ports can output the process fluid from the mounting panel 105.

In some embodiments, the first cut-out region 207 includes protrusions 201A through which to attach the temperature sensor 134 and protrusions 201B through which to attach the pressure sensor 138. In these embodiments, the multiple vias 103 include a first via 203A that leads into the first cut-out region 207, the first via 203A adapted to be in fluid communication with the temperature sensor 134, and a second via 203B that leads into the first cut-out region 207, the second via 203B adapted to be in fluid communication with the pressure sensor 138. Being in fluid communication can generally refer to being in contact with the process fluid. In some implementations, a sensing portion of the temperature sensor is inserted through the first via 203A and a sensing portion of the pressure sensor 138 is inserted through the second via 203B. In this way, the temperature sensor 134 and the pressure sensor 138 are in fluid communication with the process fluid contained in the reservoir and able to detect the temperature and pressure of the process fluid within the reservoir.

In various embodiments, different ones of the multiple vias 103 lead to each respective ones of the multiple channels 209, each via being adapted to be in fluid communication with one of the inlet ports 110A, the flow sensor 130, a pressure regulator 120, a filter 116, one of the valves 114A, 114B, or one of the outlet ports 110B. In this way, the process fluid can flow via one of many possible process fluid paths, e.g., starting at an inlet port 110A flows through a first channel, from the first channel flows into a valve 114A, from the valve 114A flows into a second channel, from the second channel flows into a pressure regular 120 or a filter 116, from the pressure regulator 120 or the filter 116 flows into a third channel, and from the third channel the process fluid flows into a reservoir or a mass flow controller 124. The reservoir or the mass flow controller 124 can further control the process fluid as the process fluid flows further into a fourth channel, where the process fluid flows from the fourth channel into a valve 114B, from the valve 114B the process fluid flows into a fifth channel, and from the fifth channel the process fluid flows out through the outlet port 110B. These are some possible flow paths as the process fluid flows from left to right in FIG. 1C, e.g., from the inlet ports 110A to the outlet ports 110B, but different paths that include different process fluid control components or different arrangements of the same process fluid control components are envisioned.

Figure 4:
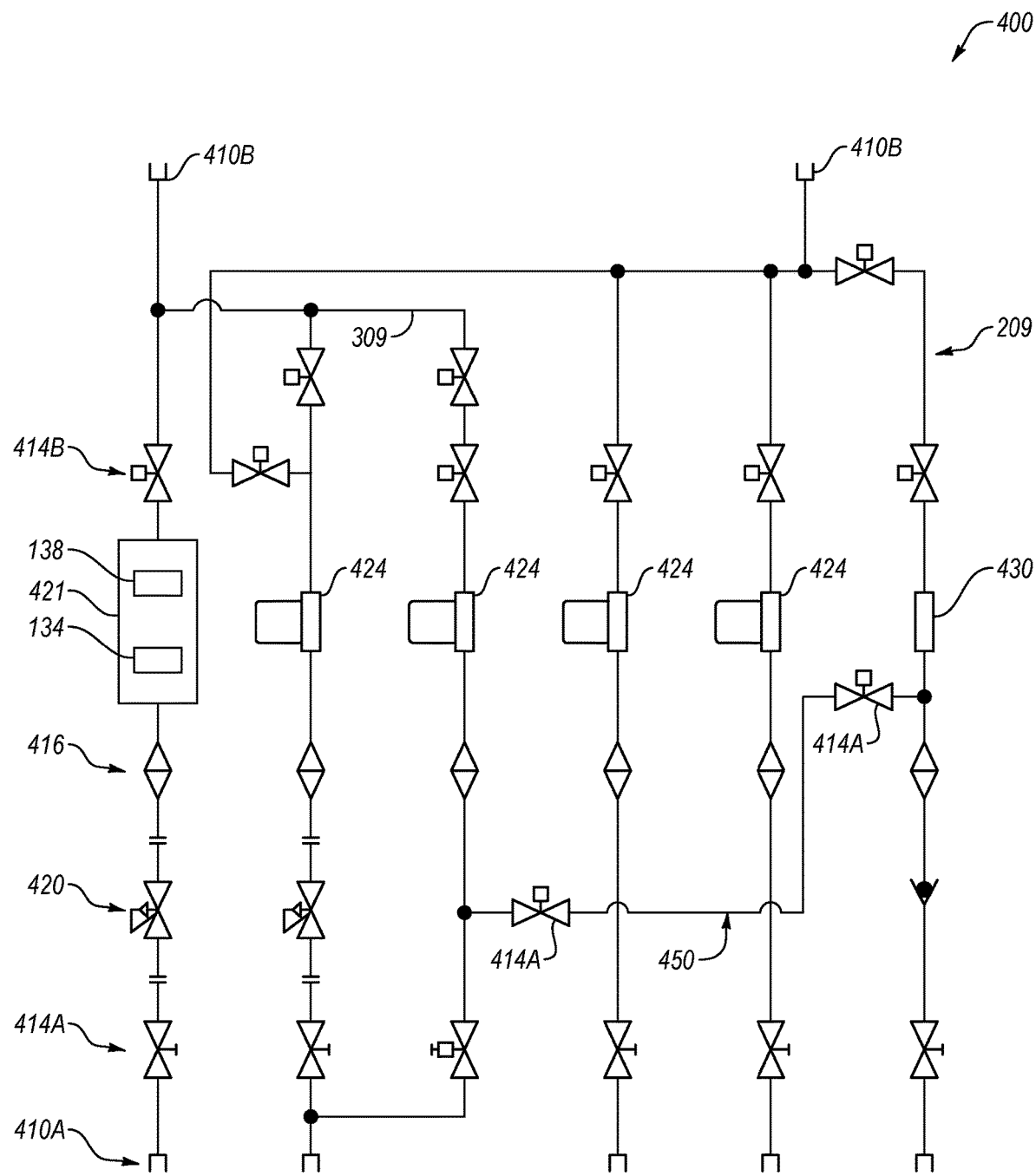
FIG. 4 is schematic process diagram of a process fluid delivery system, according to one embodiment of the disclosure.

FIG. 4 is schematic process diagram of a process fluid delivery system 400, according to one embodiment of the disclosure. The process fluid delivery system 400 includes a number of the same or similar process fluid control components as illustrated in FIGS. 1A-1C, which can be connected through the multiple vias 103 and the multiple channels 209 and 309. For example, the process fluid delivery system 400 includes a set of inlet ports 410A, at least one outlet port 410B, multiple valves 414A coupled with the inlet ports 410A, and multiple filters 416 coupled with the multiple valve 414A. In some process fluid paths, a pressure regulator 420 is interposed between a valve 414A and a filter 416.

In one embodiment, an additional channel 450, which can be one of the multiple channels 309, is connected between two of the multiple channels 209 and includes one or more additional valve 414A in fluid communication with the additional channel 450. The additional channel 450 can enable selective cross-mixture of process fluid between two of the multiple channels 209. Further, one of the multiple channels 309 can be coupled between at least two of the valves 414B that lead to the outlet port 110B, e.g., in order to selectively cross-mix process fluid and/or share the outlet port 110B for flowing the process fluid out of the mounting panel 105.

With additional reference to FIG. 4, each of a set of mass flow controller 424 can be coupled with one of the filters 416. As discussed previously, instead of a mass flow controller 424, a reservoir 421 can be formed in the mounting panel 105. Because mass flow controllers are much larger, require electronics and electrical control, and are more expensive, employing the integrated features to form the reservoir 421 within the mounting panel 105 can save on this expense as well as save on previous real estate required for a fluid control panel. In some embodiments, instead of the reservoir 421, one or more of the multiple channels 209 or 309 can be expanded in width and shortened in length. Such a modified channel or set of channels can provide higher feed pressure of the process fluid while still providing a location for containing, under specific temperature and pressure, the process fluid. One or more valves can be employed, e.g., at the entrance and/or exit of the modified channel(s) to control the flow into and out of the modified channel(s) that would replace the reservoir.

In some embodiments, each of a set of valves 414B can be connected between either the reservoir 421, one of the mass flow controllers 424, or a flow sensor 430 and one of the outlets 410B. As can be seen in FIG. 4, multiple flow control paths can be configured within the process fluid delivery system 400. For example, the multiple orifices 101 can be employed to alter the design and set of process fluid control components attached to and integrated with the mounting panel 105 to generate a different process fluid delivery system.

Figure 5:
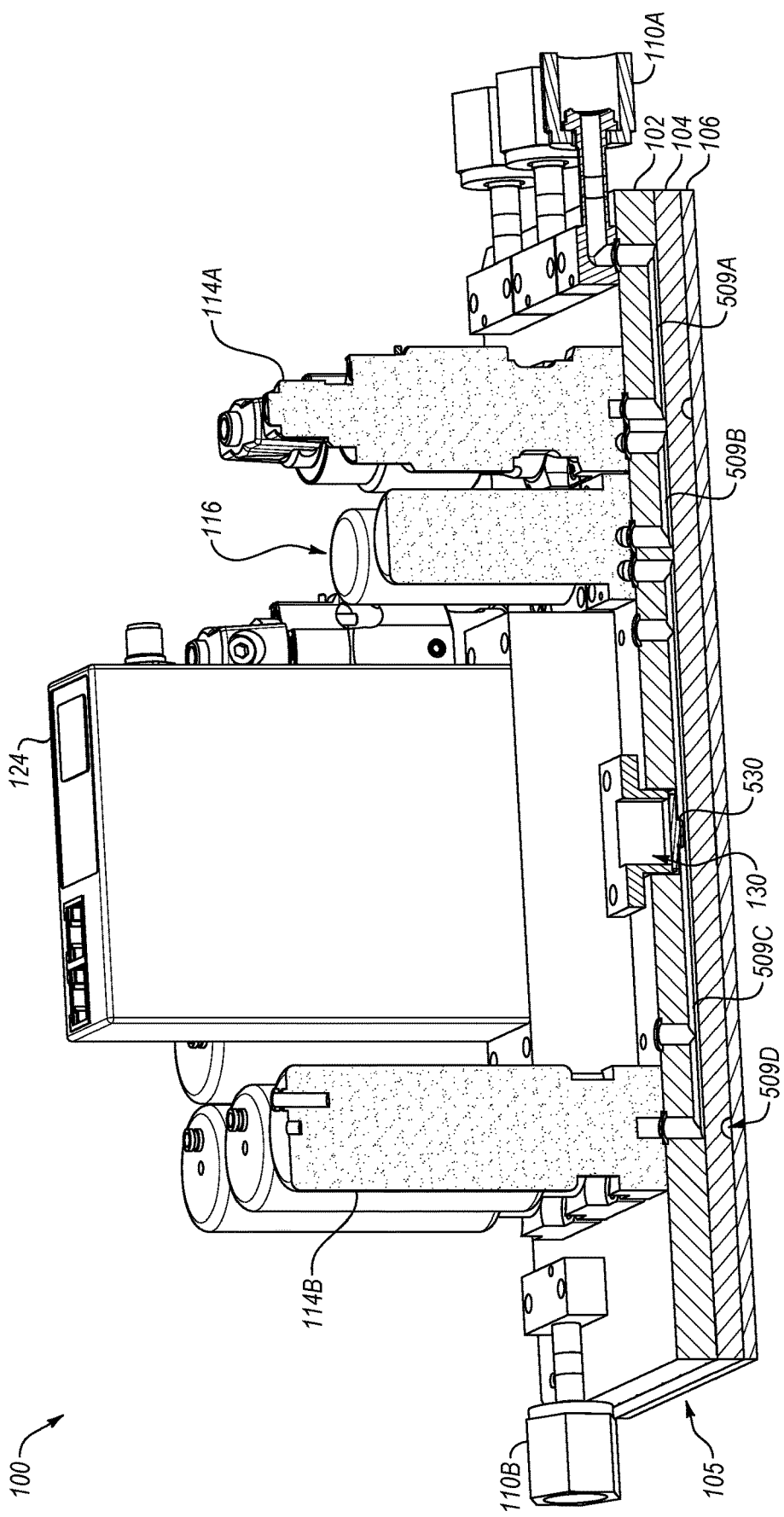
FIG. 5 is a cross-section view of the process fluid delivery system, illustrating a process flow sensor according to an embodiment of the disclosure.

FIG. 5 is a cross-section view of the process fluid delivery system 100, illustrating the process flow sensor 130 according to an embodiment of the disclosure. As illustrated, the flow sensor 130 can be located within the larger or rectangular via 103B illustrated in FIG. 1A. A protruded portion 530 of the flow sensor 130 can be the portion of the flow sensor 130 that actually passes inside of the channel 109 to detect a flow rate of the process fluid within the channel 109.

In some embodiments, the process fluid delivery system 100 further includes a first inlet port of the set of inlet ports 110A attached to the top of the mounting panel 105 and in fluid communication with a first channel 105A of the multiple channels 209 through a third via of the multiple vias 103. A valve 114A can be attached to the top of the mounting panel 105, the valve in fluid communication with: the first channel 509A through a fourth via of the multiple vias; and a second channel 509B of the multiple channels 209 through a fifth via of the multiple vias 103.

Further, a filter 116 can be attached to the top of the mounting panel 105, the filter in fluid communication with: the second channel 509B through a sixth via of the multiple vias 103 and a third channel 509C that is also in fluid communication with the flow sensor 130. In these embodiments, the flow sensor 130 is attached to a top of the mounting panel 105 and the flow sensor 130 is in fluid communication with the third channel 509A of the multiple channels 209 through a seventh via of the multiple vias 103, e.g., through the rectangular via 103B. The flow sensor 130 can sense a rate of flow of the process fluid through the first channel 509A. Another valve 114B can be attached to the mounting panel 105 and in fluid communication with the third channel 509C and with a channel 509D of the multiple channels 309, which can carry the process fluid to another of the valves 114B.

Figure 6:
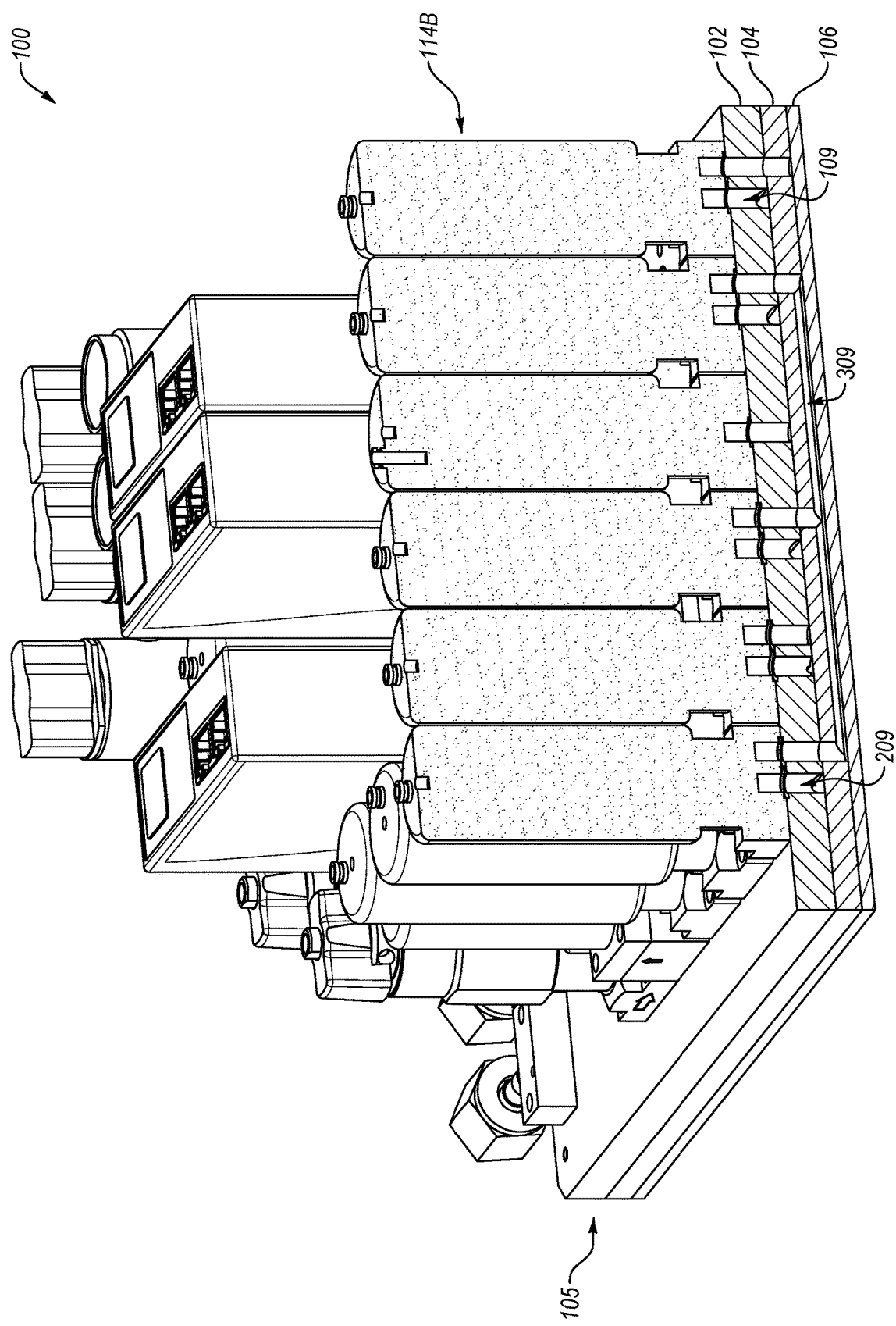
FIG. 6 is a cross-section view of a set of valves attached to the mounting panel, illustrating interconnecting channels according to an embodiment.

FIG. 6 is a cross-section view of the set of valves 114B attached to the mounting panel 105, illustrating interconnecting channels according to an embodiment. As illustrated, each valve 114B is connected to one of the multiple channels 109 formed in the top plate 102, but some of the valves 114B area also connected to one of the multiple channels 309 formed in the inner plate 104. These multiple channels 309 cross-couple some of the valves 114B in order to cross-mix process fluid and/or to share an outlet port 110B.

Figure 7:
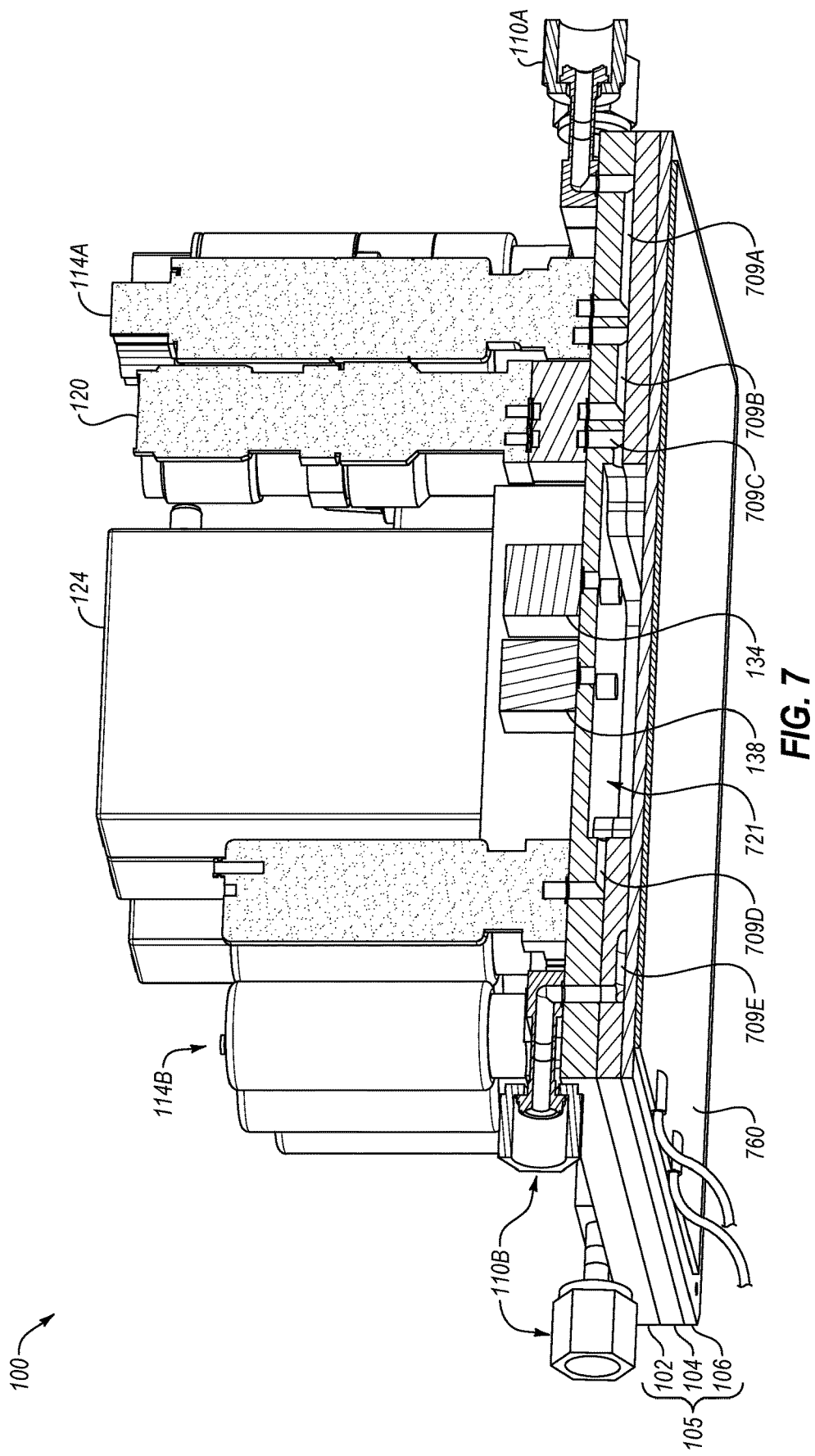
FIG. 7 is a cross-section view of a reservoir and in-path process fluid control components to the reservoir according to an embodiment of the disclosure.

FIG. 7 is a cross-section view of a reservoir 721 and in-path process fluid control components to the reservoir 721 according to an embodiment of the disclosure. As discussed with reference to FIGS. 1A-1C and FIG. 2, the first cut-out 207 in the top plate 102 and the second cut-out 107 in the inner plate 106 can be combined to correspond within the mounting panel 105, thus forming the reservoir 721. Further, a temperature-controlled plate 760 can be attached to a bottom of the mounting panel 105, e.g., to the external face of the bottom plate 106. This temperature-controlled plate 760 can have a very low profile and thus not take up much space.

In various embodiments, the temperature-controlled plate 760 can be a heating plate, a cooling plate, or a combination thereof, designed to impart one of heat or cooling to the mounting panel 105. In some embodiments, the temperature-controlled plate 760 is also diffusion bonded to the external face of the bottom plate 106. In this way, because the mounting panel 105 is an integrated, diffusion-bonded set of metal plates, the process fluid flowing through the mounting panel 105 can be maintained at a consistent temperature and pressure without the expense and space of an external temperature unit such as an external heater unit and associated thermocouples. Keeping the process fluid at a consistent temperature and pressure can ensure the process fluid remains in a gaseous state for transfer from the mounting panel 105 into one or more processing chambers or other destination. Through the use of the temperature sensor 134 and the pressure sensor 138, a control unit of the process fluid delivery system 100 can track the temperature and pressure within the reservoir 721 and trigger adjustments in real-time via the temperature-controlled plate 760, e.g., in order to maintain that consistent temperature and/or pressure despite environmental and/or component-related changes.

With additional reference to FIG. 7, in one embodiment, a first inlet port of the set of inlet ports 110A is attached to the top of the mounting panel 105 and in fluid communication with a first channel 709A of the multiple channels 209 through a second via of the multiple vias 103. Further, a valve 114A can be attached to the top of the mounting panel 105. The valve 114A can be in fluid communication with: the first channel 709A through a third via of the multiple vias 103; and a second channel 709B of the multiple channels 209 through a fourth via of the multiple vias 103. A pressure regulator 120 can be attached to the top of the mounting panel 105. The pressure regulator 120 is in fluid communication with: the second channel 709B through a fifth via of the multiple vias 103; and a third channel 709C of the multiple channels 209 through a sixth via of the multiple vias 103. In this embodiment, the third channel 709C is one of the pair of the multiple channels, e.g., is the first channel 209A (FIG. 2).

In one embodiment, a valve 114B is attached to the top of the mounting panel 105, the valve in fluid communication with: a fourth channel 709D of the multiple channels 209 through a sixth via of the multiple vias 103 and with a fifth channel 709E of the multiple channels 209 through a seventh via of the multiple vias 103. In one embodiment, the fourth channel 709D is one of the pair of the multiple channels, e.g., is the second channel 209B (FIG. 2). In one embodiment, the fifth channel 709E is in one of the multiple channels 309 in the inner plate 104. The at least one outlet port 110B is attached to the top of the mounting panel 105 and in fluid communication with the fifth channel 709E. In related embodiments, the valve 114B is a dosing valve that is variably controllable to adjust a flow rate of the process fluid through the valve 114B, or the third channel 709C is of a different size than the second channel 709B or the first channel 709A.

Figure 8:
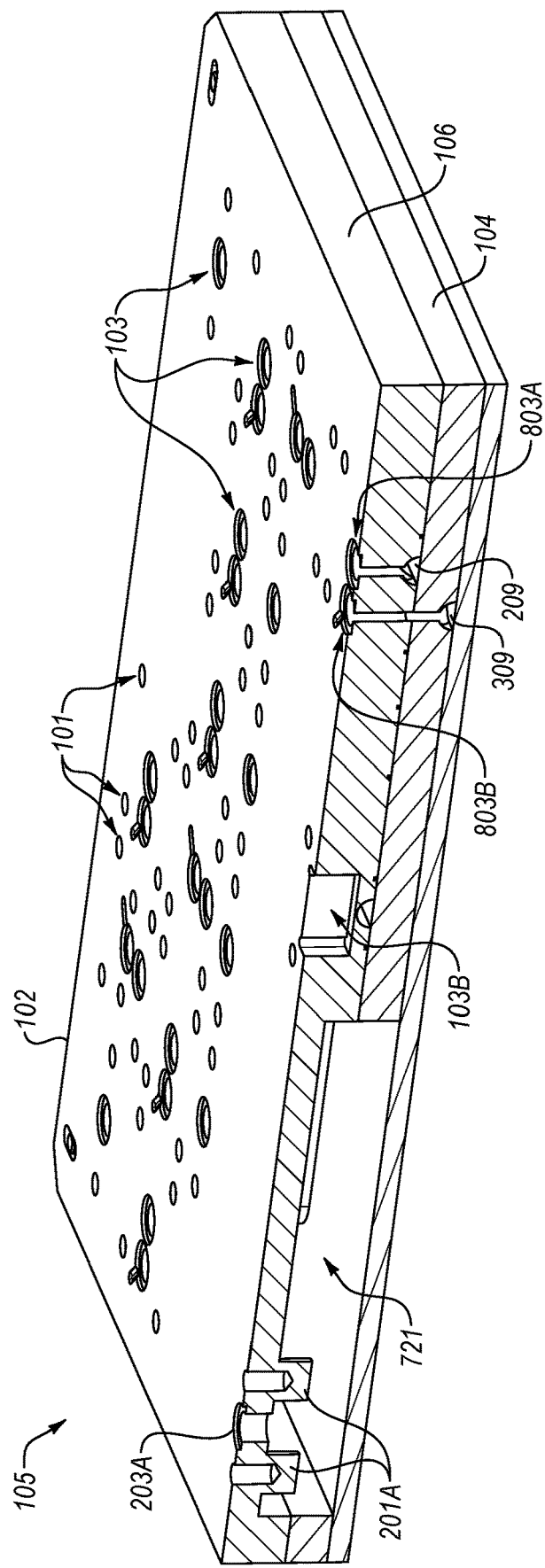
FIG. 8 is a cross-section view of the mounting panel generally along a mid-line of the mounting panel according to an embodiment.

FIG. 8 is a cross-section view of the mounting panel 105 generally along a mid-line of the mounting panel according to an embodiment. This cross-section view has a number of features already illustrated and discussed within the mounting panel 105, but illustrates how, in one embodiment, a first via 803A of the multiple vias 103 can go through the top plate 102 to a channel 209 of the top plate 102 (FIG. 2) while a second via 803B of the multiple vias 103 can go through the top plate 102 and the inner plate 104 to a channel 309 of the inner plate 104 (FIG. 3). In this way, the various vias of the top plate 102 and the inner plate 104 (or other intermediate plate) can lead to one of a combination of the multiple channels 209 and 309. It would be apparent to one skilled in the art that additional intermediate plates could include additional channels and vias in order to build out a more complicated 3D mounting panel that includes additional reservoirs and channels in order to replace even more of the mass flow controllers and other control valves by building their functionality into the mounting panel.

Figure 9:
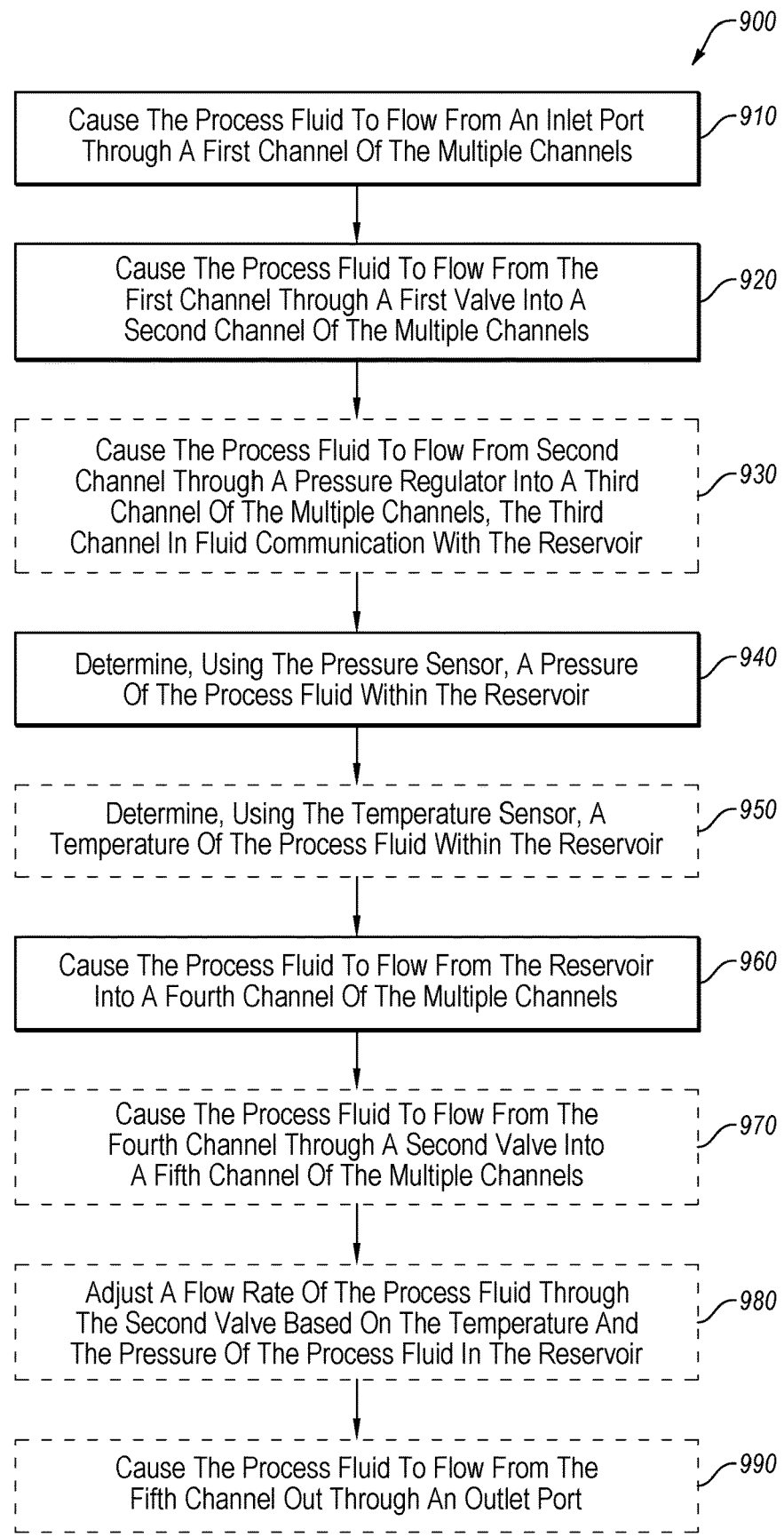
FIG. 9 is a flow chart of a method for operating a process fluid delivery system that includes a diffusion-bonded mounting panel, according to various embodiments of the disclosure.

FIG. 9 is a flow chart of a method 900 for operating a process fluid delivery system that includes a diffusion-bonded mounting panel, according to various embodiments of the disclosure. For example, the process fluid delivery system 100 can include a mounting panel that forms a reservoir to contain a process fluid, multiple channels through which to flow the process fluid, multiple vias between a top of the mounting panel and the reservoir and between the top of the mounting panel and the multiple channels. The process fluid delivery system can further include a pressure sensor attached to a top of the mounting panel and that is in fluid communication with the reservoir. Further, the process fluid delivery system 100 can include a temperature sensor attached to the top of the mounting panel and that is in fluid communication with the reservoir.

At operation 910, the system causes the process fluid to flow from an inlet port through a first channel of the multiple channels.

At operation 920, the system causes the process fluid to flow from the first channel through a first valve into a second channel of the multiple channels. In some embodiments, the system causes the process fluid to flow from the second channel directly into the reservoir. In other embodiments, the process fluid optionally also flows through the pressure regulator before flowing into the reservoir, which is operation 930.

At operation 930, the system causes the process fluid to flow from the second channel through a pressure regulator into a third channel of the multiple channels, the third channel in fluid communication with the reservoir.

At operation 940, the system determines, using the pressure sensor, a pressure of the process fluid within the reservoir.

At operation 950, the system further determines, using the temperature sensor, a temperature of the process fluid within the reservoir.

At operation 960, the system causes the process fluid to flow from the reservoir into a fourth channel of the multiple channels.

At operation 970, the system causes the process fluid to flow from the fourth channel through a second valve into a fifth channel of the multiple channels.

At operation 980, the system adjusts a flow rate of the process fluid through the second valve based on the temperature and the pressure of the process fluid in the reservoir.

At operation 990, the system causes the process fluid to flow from the fifth channel out through an outlet port. In various embodiments, operations 950 through 990 are optional.

The preceding description sets forth numerous specific details such as examples of specific systems, components, methods, and so forth in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or." When the term "about" or "approximately" is used herein, this is intended to mean that the nominal value presented is precise within ±10%.

Although the operations of the methods herein are shown and described in a particular order, the order of operations of each method may be altered so that certain operations may be performed in an inverse order so that certain operations may be performed, at least in part, concurrently with other operations. In another embodiment, instructions or sub-operations of distinct operations may be in an intermittent and/or alternating manner.

It is understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. An apparatus comprising:
   a mounting panel comprising:
      a top plate having multiple vias, wherein an internal face of the top plate includes a first cut-out region and a plurality of channels through which to flow a process fluid, wherein the first cut-out region at least partially defines a reservoir in which to contain the process fluid, wherein the multiple vias are adapted for passing the process fluid through the top plate and the plurality of channels, and wherein a via of the multiple vias leads into the first cut-out region and is adapted to be in fluid communication with one of a temperature sensor or a pressure sensor;
      an inner plate also having multiple additional vias; and
      a bottom plate, wherein the inner plate is compacted between the top plate and the bottom plate to form an integral metallic body in which to contain and flow the process fluid.

2. The apparatus of claim 1, wherein an internal face of the inner plate also includes a plurality of channels through which to flow process fluid, and wherein the inner plate also has a second cut-out region, wherein the first cut-out region and the second cut-out region correspond to form the reservoir.

3. The apparatus of claim 1, wherein the top plate, the inner plate, and the bottom plate are diffusion-bonded metal plates, and wherein the internal face of the top plate further comprises one or more grooves to at least facilitate checking leak integrity of the diffusion-bonded metal plates.

4. The apparatus of claim 1, wherein the plurality of channels include a first channel that leads into the reservoir from a first side of the reservoir and a second channel that exits from a second side of the reservoir, and wherein the multiple vias include at least one precision-sized via positioned at an exit of the second channel and designed to control a flow rate of the process fluid that exits the reservoir.

5. The apparatus of claim 1, wherein the multiple vias include:
- a first via that leads into the first cut-out region, the first via adapted to be in fluid communication with the temperature sensor; and
- a second via that leads into the first cut-out region, the second via adapted to be in fluid communication with the pressure sensor.

6. The apparatus of claim 1, wherein the multiple vias include a second via that leads to one of the plurality of channels, the second via adapted to be in fluid communication with one of a flow sensor, a pressure regulator, a filter, or a valve.

7. The apparatus of claim 1, wherein at least some of the multiple vias vary in size to cause different rates of flow of the process fluid through the mounting panel.

8. The apparatus of claim 1, wherein the top plate further includes multiple orifices adapted for attaching a plurality of process fluid control components to the mounting panel.

* * * * *